(12) United States Patent
Colton et al.

(10) Patent No.: US 7,596,620 B1
(45) Date of Patent: Sep. 29, 2009

(54) SYSTEM AND METHOD FOR DEVELOPING, DEPLOYING, MANAGING AND MONITORING A WEB APPLICATION IN A SINGLE ENVIRONMENT

(75) Inventors: Paul Colton, Hillsborough, CA (US); Uri Sarid, Menlo Park, CA (US)

(73) Assignee: Aptana, Inc., San Mateo, CA (US)

( * ) Notice: Subject to any disclaimer, the term of this patent is extended or adjusted under 35 U.S.C. 154(b) by 0 days.

(21) Appl. No.: 12/264,882

(22) Filed: Nov. 4, 2008

(51) Int. Cl.
  *G06F 15/173* (2006.01)
(52) U.S. Cl. .................. 709/226; 709/223; 709/224; 709/201
(58) Field of Classification Search ......... 709/223–224, 709/226
  See application file for complete search history.

(56) References Cited

U.S. PATENT DOCUMENTS

| 6,453,335 | B1 | 9/2002 | Kaufmann |
| 6,609,246 | B1 | 8/2003 | Guhr et al. |
| 7,284,054 | B2 | 10/2007 | Radhakrishman |
| 2003/0061404 | A1* | 3/2003 | Atwal et al. ................. 709/328 |
| 2004/0177335 | A1 | 9/2004 | Beisiegel et al. |
| 2005/0044197 | A1* | 2/2005 | Lai ............................ 709/223 |
| 2006/0136555 | A1* | 6/2006 | Patrick et al. ............... 709/203 |
| 2007/0150480 | A1* | 6/2007 | Hwang et al. ................. 707/10 |
| 2008/0294794 | A1* | 11/2008 | Darugar et al. .............. 709/238 |

\* cited by examiner

*Primary Examiner*—Jeffrey Pwu
*Assistant Examiner*—David Ampagoomian
(74) *Attorney, Agent, or Firm*—Clause Eight IPS; Michael Catania

(57) ABSTRACT

A system and method for developing, deploying, managing and monitoring a web application in a single environment is disclosed herein. The single environment is preferably an integrated development environment ("IDE"). The system and method preferably allows for deployment to a cloud provider, and preferably allows for use of Web resources from multiple cloud providers. One preferred IDE is the APTANA® STUDIO IDE. An operator can use a user interface to access the integrated development environment and the cloud manager over the network, specifically the Internet.

2 Claims, 12 Drawing Sheets www.aptana.com/studio/cloud aptana

Project jQuerySandbox
  Jaxer-include
  Lib
  Index-html
  Jquery_sample htm
  Jquery_sample.js
  Test.html aptana.tv9397[https:.
  expressinstall.swf 70
  flvplayer.swf7050
  index.html
  index_new.html
  PlayQTFlash.html7
  shared_movie.css2
  shared.css2
  swfobject.js 3457
  transcript.css2

Cars90210

Overview

Sync Both Up Down
Last sync by khakman(10/7/2008 14:32 GMT)

Service Plan
1/8CPU, 512 MB, 10GB  Change

Stats: Hits Last 7 days

Local Project
  _/gullwing
Local URL
127.0.01/
Main URL
http://www
Staged SiteURL
http://cars90210
Server IP Address
10.168.245.34
SVN Location
svn.cars90210.a Warning! Cars90210 has been exceeding 80% capacity.
UPGRADE NOW

Sync Preview for "gullwing (local) to "cars92010(stage)"

| | Merged view of origin and destination files | | Gullwing (local) | Cars90210 (stage) |
|---|---|---|---|---|
| | com.aptana.ide.framework.jaxer.server.win32 | x | modified | modified |
| | com.apatana.ide.libaries.jetty | | | modified |
| | com.aptana.ide.server.cloud | | modified | modified |
| | src/com/aptana/ide/server/cloud./services/model | | modified | modified |
| | src/com/aptana/ide/server/cloud./services/sitemanager | | | new |
| | SiteManager.java | | | new |
| | SiteManagerProvider.java | | | new |
| | src/com/aptana/ide/server/cloud./testdriver | | modified | modified |
| | AppTester.java | | | new |
| | DescribeSiteTester.java | | | delete |
| | EndToEndTester.java | | | delete |
| | SiteTester.java | x | update | |
| | src/com/aptana/ide/server/cloud/ui | | skip | skip |
| | ApplicationSynchronizeWidget.java | | skip | skip |
| | classpath | | skip | skip |
| | com.aptana.ide.server.jetty | | Comparing | 50%remaining |
| | com.apatana.ide.syncing | x | modified | modified |
| | org.rubypeople.rdt.ui | | new | new |
| | site_manager | | new | new |
| | triggers | | new | new |

Cancel  Start Sync

Checking file:../gullwing/index.html

Overall Progress

SYSTEM AND METHOD FOR DEVELOPING, DEPLOYING, MANAGING AND MONITORING A WEB APPLICATION IN A SINGLE ENVIRONMENT

CROSS REFERENCE TO RELATED APPLICATION

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to cloud computing. More specifically, the present invention relates to a system and method for developing, deploying, managing and monitoring a Web application in a single environment.

2. Description of the Related Art

In general terms, cloud computing provides a developer (individual or company) to have access to resources for a Web application, in particular a web site. Various vendors provide cloud computing to the developer community. Such vendors include JOYENT (see joyent.com), Amazon Web Services (See amazon.com), Google App Engine (see http://code.google.com/appengine/) and others.

General definitions for terms utilized in the pertinent art are set forth below.

Applets or Java Applets are mini-executable programs named with the .class suffix and are placed on the web page and provide interactive and multimedia uses.

Application Programming Interface (API) is a collection of computer software code, usually a set of class definitions, that can perform a set of related complex tasks, but has a limited set of controls that may be manipulated by other software-code entities. The set of controls is deliberately limited for the sake of clarity and ease of use, so that programmers do not have to work with the detail contained within the given API itself.

Asynchronous Server-Side Processing is a means for avoiding having to reload a new page for every request sent by a client and involves placing a intermediary between a client and server in order to send a request to the intermediary (i.e. XMLHttpRequest object) which sends it to the server for processing and receives the response from the server for passing on to the client.

Boot or Bootstrap refers to loading the first piece of software that starts a computer since the operating system is essential for running all other programs, it is usually the first piece of software loaded during the boot process.

A Channel is information about organized content on an intranet or the Internet. Channels enable Web developers to categorize and describe Web site content and make that data available to users on demand.

Cloud computing is generally defined as using computing resources, primarily servers, owned by a third party provider (such as the AMAZON ELASTIC COMPUTE CLOUD, JOYENT, and GOOGLE APPS) such that the user does not need to make a substantial investment in computer hardware and scale resources depending on the user's needs. Cloud computing primarily involves Web applications but can include storage, raw computing and other specialized services.

FTP or File Transfer Protocol is a protocol for moving files over the Internet from one computer to another.

HyperText Markup Language (HTML) is a method of mixing text and other content with layout and appearance commands in a file, so that a browser can generate a display from the file.

Hypertext Transfer Protocol (HTTP) is a set of conventions for controlling the transfer of information via the Internet from a Web server computer to a client computer, and also from a client computer to a Web server.

Internet is the worldwide, decentralized totality of server computers and data-transmission paths which can supply information to a connected client computer, and can receive and forward information entered from the client computer.

JavaScript is an object-based programming language. JavaScript is an interpreted language, not a compiled language. JavaScript is generally designed for writing software routines that operate within a client computer on the Internet. Generally, the software routines are downloaded to the client computer at the beginning of the interactive session, if they are not already cached on the client computer. JavaScript is discussed in greater detail below.

JSON is JavaScript Object Notation format, which is a way of taking data and turning it into valid a representation of program information that can be read by another program.

MySQL is a relational database management system which relies on SQL for processing data in a database.

Parser is a component of a compiler that analyzes a sequence of tokens to determine its grammatical structure with respect to a given formal grammar. Parsing transforms input text into a data structure, usually a tree, which is suitable for later processing and which captures the implied hierarchy of the input. XML Parsers ensure that an XML document follows the rules of XML markup syntax correctly.

Platform is the combination of a client computer, an operating system, and a browser, which together can support HTTP access and in particular the operation of interactive forms.

Portlet is a Web based component that will process requests and generate dynamic content. The end-user essentially sees a portlet as being a specialized content area within a Web page that occupies a small window. One could use this content area (the portlet) to receive different types of information. The portlet provides users with the capability to customize the content, appearance and position of the portlet.

Provisioning is the act of supplying and configuring computing resources, primarily servers, for a web application.

Pulling or Pull Technology is technology that enables Web browsers to retrieve information from a Web server such as updating information at periodic intervals, essentially Web browser initiated activity.

Pushing or Push Technology is technology that initiates delivery of material from a server to a properly configured Web browser, such as providing automatic updates to a Web browser.

Serialization places an object in a binary form for transmission across a network such as the Internet and deserialization involves extracting a data structure from a series of bytes.

Servlets are objects that receive requests and generate a response based on that request.

SQL (Structured Query Language) is a computer language designed for data retrieval and data management in a database.

Structural layer of a web page is the marked up document and foundation on which other layers may be applied.

URL or Uniform Resource Locator is a address on the World Wide Web.

User is a client computer, generally operated by a human being, but in some system contexts running an automated process not under full-time human control.

User Interface or UI is the junction between a user and a computer program. An interface is a set of commands or menus through which a user communicates with a program. A command driven interface is one in which the user enter commands. A menu-driven interface is one in which the user selects command choices from various menus displayed on the screen.

Web-Browser is a complex software program, resident in a client computer, that is capable of loading and displaying text and images and exhibiting behaviors as encoded in HTML (HyperText Markup Language) from the Internet, and also from the client computer's memory. Major browsers include MICROSOFT INTERNET EXPLORER, NETSCAPE, APPLE SAFARI, MOZILLA FIREFOX, and OPERA.

Web-Server is a computer able to simultaneously manage many Internet information-exchange processes at the same time. Normally, server computers are more powerful than client computers, and are administratively and/or geographically centralized. An interactive-form information-collection process generally is controlled from a server computer.

World Wide Web Consortium (W3C) is an unofficial standards body which creates and oversees the development of web technologies and the application of those technologies.

XHTML (Extensible Hypertext Markup Language) is a language for describing the content of hypertext documents intended to be viewed or read in a browser.

XML (Extensible Markup Language) is a W3C standard for text document markup, and it is not a language but a set of rules for creating other markup languages.

As shown in FIG. 1A, a cloud computing system 20' of the prior art generally involves a single cloud provider 28' which is accessed from a user 22' at a user interface 24' over a network 40' such as the Internet. The user 22' can only work with the single cloud provider 28' and is provided very little information about the performance of the web application on the cloud provider 28'. Further, in order to scale up, the user 22' must repeat the uploading process.

However, current technologies fail to provide a system and method for developing, deploying, managing and monitoring a web application in a single environment.

BRIEF SUMMARY OF THE INVENTION

The Present Invention overcomes the obstacles of the prior art and provides a method and system for developing, deploying, managing and monitoring a web application in a single environment.

One aspect of the present invention is a system for developing, deploying, managing and monitoring a web application in a single environment. The system includes an integrated development environment for developing a web application, a network, a primary cloud provider having a primary plurality of web resources, at least one secondary cloud provider having a secondary plurality of web resources, a cloud manager having an application programming interface, and a user interface. The cloud manager remotely manages the web application. The cloud manager is capable of monitoring the web application to determine if a current level of web resources is appropriate for the web application to perform within a predetermined performance range. The cloud manager is capable of accessing and providing the primary plurality of web resources from the primary cloud provider for the web application and the cloud manager is capable of accessing and providing the secondary plurality of web resources from the secondary cloud provider for the web application. The user interface is for an operator to access the integrated development environment and the cloud manager over the network.

Another aspect of the present invention is a method for developing, deploying, managing and monitoring a web application in a single environment. The method includes developing a web application in a single environment. The method also includes provisioning the web application. The method also includes deploying the web application to a primary cloud provider having a primary plurality of web resources. The method also includes managing the web application within the single environment determine if a current level of web resources is appropriate for the web application to perform within a predetermined performance range. The method also includes accessing and providing the primary plurality of web resources from the primary cloud provider for the web application. The method also includes accessing and providing a secondary plurality of web resources from at least one secondary cloud provider for the web application. The method also includes monitoring the performance of the web application from the single environment.

Managing the web application preferably comprises temporarily adding web resources from the secondary plurality of web resources during a time period of high demand for the web application. Monitoring the performance of the web application preferably comprises monitoring the load on the web application. Developing the web application at the single environment preferably comprises providing a plurality of libraries, a plurality of plugins, and a URL.

Monitoring and managing the Web site preferably comprises monitoring the load on the web site and temporarily adding web resources from the secondary plurality of web resources during a time period of high demand for the web site. Developing the web site preferably comprises using client-technology languages and server-side languages. The client-technology languages preferably comprise HTML, CSS and JavaScript, and the server-side languages preferably comprise PHP, Ruby, Python, Java and JavaScript.

The present invention is a new way to think about "back-office" computing needs. Rather than worrying about where to host a Web site, how to configure a Web server, and how to set up additional services, the present invention enables a user to push all of these concerns and worries to someone else, and more importantly, somewhere else. It's all handled for over the Internet, dynamically and completely managed. In short, all of a user's technology needs on the back-end are handled as a service, much like an electric or a telephone bill.

The present invention provides scalable PHP, MySQL, APACHE and APTANA JAXER app platforms as a service. Production and staging environments are both provided out of the box. In addition multiple software as service solutions are provided supporting the entirety of a user's application lifecycle: from development to deployment to management and monitoring. To make this the ultimate in ease, these solutions are also integrated directly into the workflows of an IDE. These software services include hosted source control (SVN), team member management, database tools, one-click back-ups, Web stats and site performance statistics, and an active monitoring and alert system that will notify a user of key events in the system when they happen.

Full SSH, SFTP, and SVN access to a user's site outside of the IDE is provided. PHP, mySQL, Apache and APTANA JAXER app stacks are all open source app stacks that one can either set up individually, or are supported by other hosting service providers as well.

The present invention is preferably built to compliment computing utilities. The present invention not only preferably provides on-demand scalability from such computing utilities, it also provides pre-configured app stacks ready to run apps, management tools integrated right into the IDE, and access to hosted source control and staging servers that help a user work more efficiently with others.

With the present invention, the inefficiencies of working with VPS and traditional hosts are a thing of the past. Instead of mere FTP or SSH accounts to a server with fixed capacities, the present invention provides on-demand scalability of Cloud computing, plus services like source control, team management and staging that integrate right into the IDE and workflow.

The present invention works with JOYENT, which serves over one billion page views a month, including some of the largest Facebook apps. Currently there are over 4000 PHP apps running on JOYENT. Each Cloud site created with the present invention has a static IP address.

Having briefly described the present invention, the above and further objects, features and advantages thereof will be recognized by those skilled in the pertinent art from the following detailed description of the invention when taken in conjunction with the accompanying drawings.

BRIEF DESCRIPTION OF THE SEVERAL VIEWS OF THE DRAWINGS

FIG. 6 is a screen page within an IDE on a user-interface illustrating a monitoring page for a Web Application.

FIG. 9 is a screen page on a user-interface illustrating a synching page for a Web Application.

DETAILED DESCRIPTION OF THE INVENTION

The present invention provides a novel system and method for a user to develop a Web application such as a Web site, deploy the Web application for access over the Internet, manage and monitor the Web application to ensure adequate resources are provided during times of heavy traffic such as heavy viewing of a Web site.

Figure 1:
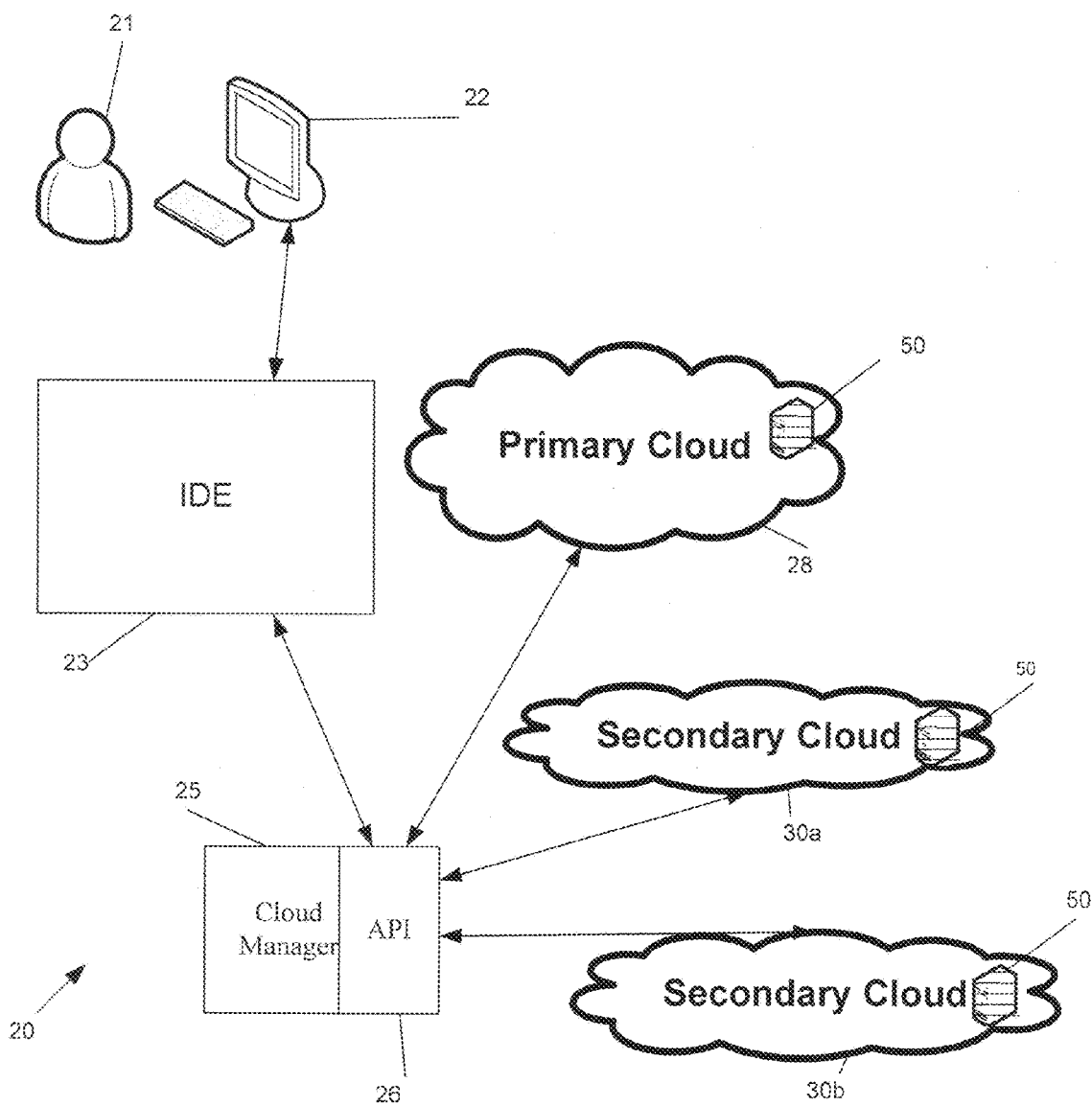
FIG. 1 is a block diagram of a preferred embodiment of a system of the present invention.
Figure 1A:
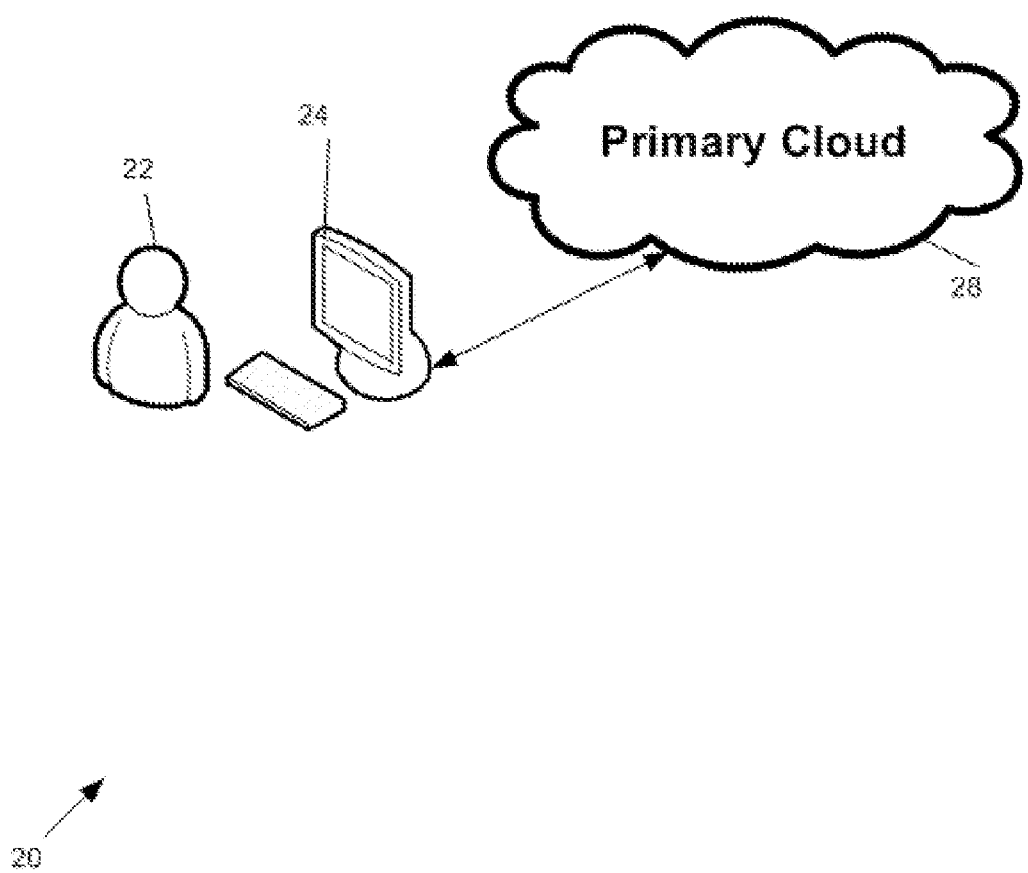
FIG. 1A is a block diagram of a cloud system of the prior art.

As shown in FIG. 1, a system 20 generally includes an IDE 23, a cloud manager 25 having a cloud manager API 26, a primary cloud provider 28, a secondary cloud provider 30a and a second secondary cloud provider 30b. A web application 32 is located at the primary cloud provider 28. The cloud manager 25 communicates over a network 40 (shown by dashed lines) directly with the Web application 32, the primary cloud provider 28, the secondary cloud provider 30a and the second secondary cloud provider 30b. Those skilled in the pertinent art will recognize that the system may only include one cloud provider, or more than three cloud providers. A developer/user 21 operating from a user interface 22 also communicates over the network 40. Preferably, the network is the Internet, however those skilled in the pertinent art will recognize that the network may be an Intranet or like network. The user interface 22 preferably communicates with the cloud manager 26 through the IDE 23. However, as discussed herein, once a Web application 32 is deployed, the user interface 22 preferably communicates directly with the cloud manager 25.

A user interface 22 (also referred to as UI) is typically a computer which includes a processing means for interacting with various input and output devices ("I/O devices"), and various networks. The I/O Devices can be drives, a keyboard, a display, a scanner, a mouse and the like. The processing means typically includes a CPU such as an INTEL PENTIUM™ processor or the like. The processing means also preferably includes a memory (random access memory and read only memory) and interfaces for communicating with networks and the I/O Devices.

The IDE 23 provides a user 21 with the tools necessary to build a Web application such as a Web site. One such IDE is set forth at aptana.com, which is hereby incorporated by reference in its entirety. The APTANA IDE is an open-source, cross-platform, JAVA script-focused development environment for preferably building AJAX applications. However, those skilled in the pertinent art will recognize that other IDEs may be utilized without departing from the scope and spirit of the present invention. An IDE 23 is provided to facilitate the development of software applications or other software programs by one or more software developers. The IDE 23 can include one or more servers, work stations, and other components, as well as languages, compliers, editors, and other tools used by developers in the development environment. The IDE 23 is preferably confined to a single geographic location or alternatively can be distributed across a plurality of geographic locations. A geographically diverse configuration would typically include one or more communication channels (networks or otherwise) among the various development locations to allow for a collaborative work environment. The IDE includes a suite of tools to assist in Web application development projects. Various aspects of a preferred IDE 23 are described below.

The primary cloud provider 28, first secondary cloud provider 30a and second secondary cloud provider 30b, and any other cloud providers, each provide Web resources that may be used for the Web application 32. The Web resources are primarily servers, owned by a third party provider (such as the AMAZON ELASTIC COMPUTE CLOUD, JOYENT, and GOOGLE APPS) such that the user does not need to make a substantial investment in computer hardware and can scale resources depending on the user's needs.

The cloud manager 25 automatically manages the Web resource needs of the Web application 32. The cloud manager 25 provisions the Web application 32, syncs the Web application 32, and automatically provides scalability for the Web application 32. A more detailed explanation of the cloud manager is provided below.

Figure 2:
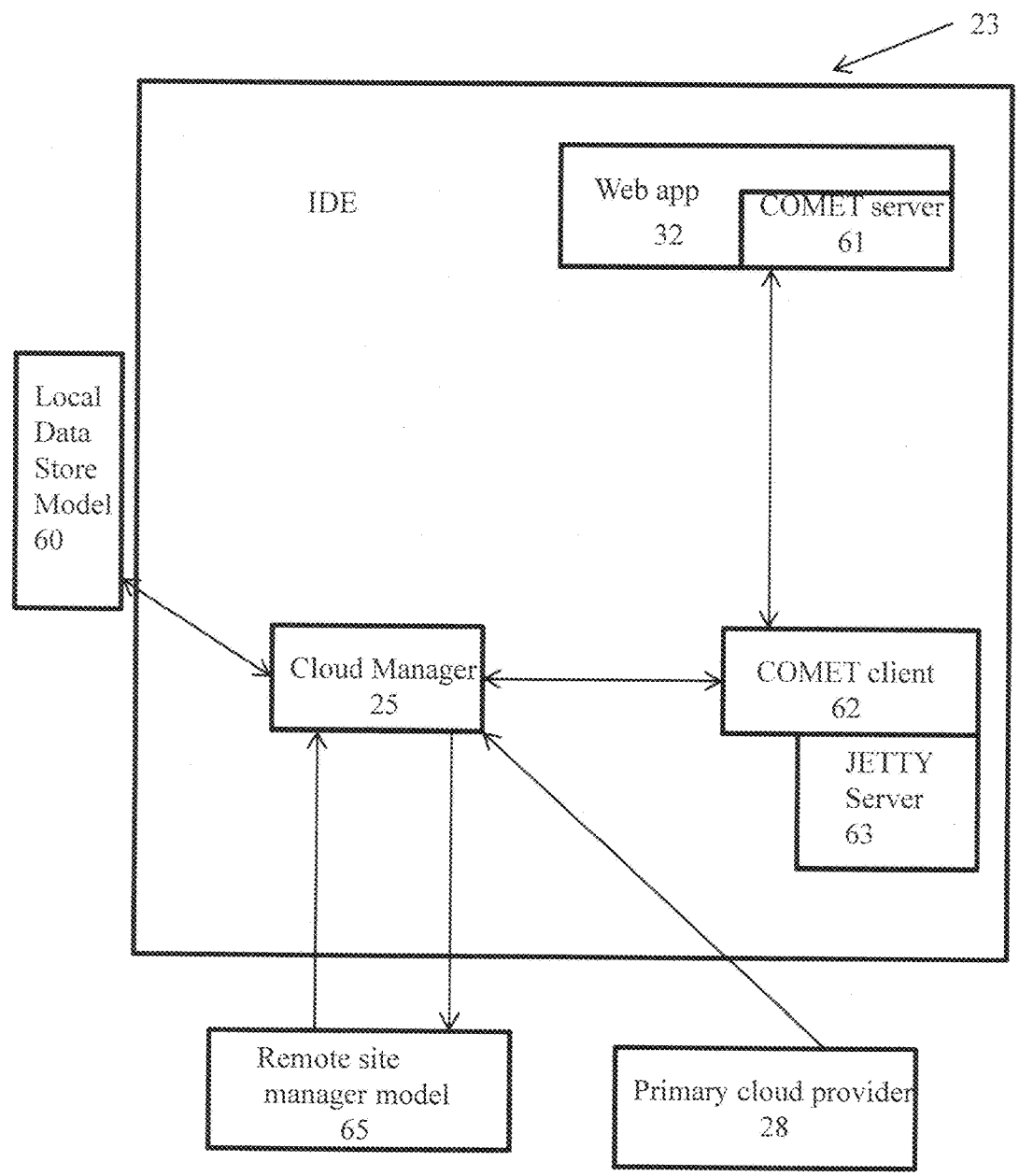
FIG. 2 is a block diagram of a preferred embodiment of the software architecture of the present invention.

FIG. 2 is a block diagram of the software architecture of the present invention. FIG. 2 illustrates the overall architecture residing in and interacting with the IDE 23. The cloud manager 25 loads once the user logs in using his Aptana ID. This ID is persisted between startup, so that the cloud manager 25 may be loaded immediately when the IDE 23 begins, for example the APTANA Studio. The cloud manager 25 first loads from a local data store model 60, if it exists, and then synchronizes the local data store model 60 with a remote site manager model 65. Any model change events will only be fired for differences found between the local data store model 60 and the site manager model 65. The components of the architecture include the IDE, (STUDIO), the MyCloud Web application 32, the MyCloud server, the site manager provider and the site manager. The MyCloud Web application 32 is located inside an embedded browser of the IDE 23. The MyCloud server comprises a JETTY HTTP server 63, servlets for the IDE requests, (e.g., obtaining projects in the local workspace), servlets that delegate to site manager services (e.g., listing the deployed projects and their status), and a COMET client 62 for messaging bus (pumps events from a messaging queue and a local store). The site manager provider performs client implementation of site manager services, polling the site manager for notifications an events (adds events to a messaging queue and a local store), and maintains and synchronizes a user/project model with the site manager. The site manager contains the Web services for deployed projects and account management. In an example of a preferred embodiment, the portal index page is at com.aptana.ide.serverjetty/content/index.html.

function setup ( )
{
   dojo.require("dojox.cometd")
   dojo.connect (dojox.cometd, "finishInit",
   function (type, data, evt, request) {
     dojox.cometd.subscribe (
     "/portal/portlets/"+dojox.cometd.clientId,
     "echoRpcReturn"
     }
   }
   );

Dojox.cometd.init("/cometd");

}

The flow preferably involves the initial portal index page requesting a list of portlets from /portlal/portlets. The IDE 23 returns a list of configured portlets and URL to request a bootstrap JavaScript code (e.g., /portlets/cloud). The portal index page executes the bootstrap code to alter the model and the user interface as appropriate per portlet. The portlet can continue to request new files and resources from for example /portlets/portlet id/ sub urls (/portlets/cloud/images/cloud_portlet banner.png).

The MyCloud Servlets involve comet architecture that specifies channels for publishing and subscription. A common model involves a client subscribing to a client-id specific channel, but publishing on a generic channel. For example, a client subscribes to /portal.portlets.a1234564, the client publishes to /portal/portlets, with published implicitly including the client ID. The return messages are routed to the specific channel subscribed to by the user. Alternatively, the return messages are routed to a global "broadcast" channel, such as /projects.

The portal is preferably an AJAX Web application that operates on top of the internal Jetty server 63 and communicates with the IDE 23 through comet 61. End users access the portal through IDE buttons, and the basics of starting up and debugging are briefly discussed below. In order to ensure that no XHR requests remain unterminated (or waiting to time out) when the portal is closed and then re-opened, the IDE 23 completely terminates the internal JETTY server 63 every time that a user closes the portal view. As such, the portal needs to use a different port every time, starting with 8500 and incrementing by 1 each subsequent time the portal is loaded. Similarly, the cometd server runs on its own port, starting with 8600. For the portal to load properly, the portal should preferably be requested as follows: http://localhost:[port number]/index.html?port=[comet port number]. For debugging the portal, the log output contains every major action logged preferably using FIREBUG. Therefore, a review of the log output should identify the problem.

URL parameters are used to have the portal load with specific content rather than the default "Home" page. A specific tab is loaded with a query string pram: tab having possible values of 'my_aptana' or 'my_cloud', for example, http://localhost:8500/index.html?port=8600&tab=my_cloud. To a load a specific site in "My Cloud" query string param: siteId with possible values of any site Id for the logged in user for example http://localhost:8500/index.html?port=8600&tab=my_cloud&siteId=1234.

To deploy a project to the Cloud, query string param: project. Possible Values are any undeployed project (url encoded, case-sensitive), for example: http://localhost:8500/index.html?port=8600&project=MyCoolProject.

To start at a specific product in "My Aptana", query string param: product. Possible Values are studio, plugins, jaxer and cloud. For example: http://localhost:8500/index.html?port=8600&product=plugins.

The servlet listing returns JSON data. Preferably, JSON data will be parsed, not evaluated. Model API directly on cloud manager, or have channels like /project/create?.

Studio-centric requests involve license information, preferences and projects (date/time last updated).

Figure 2A:
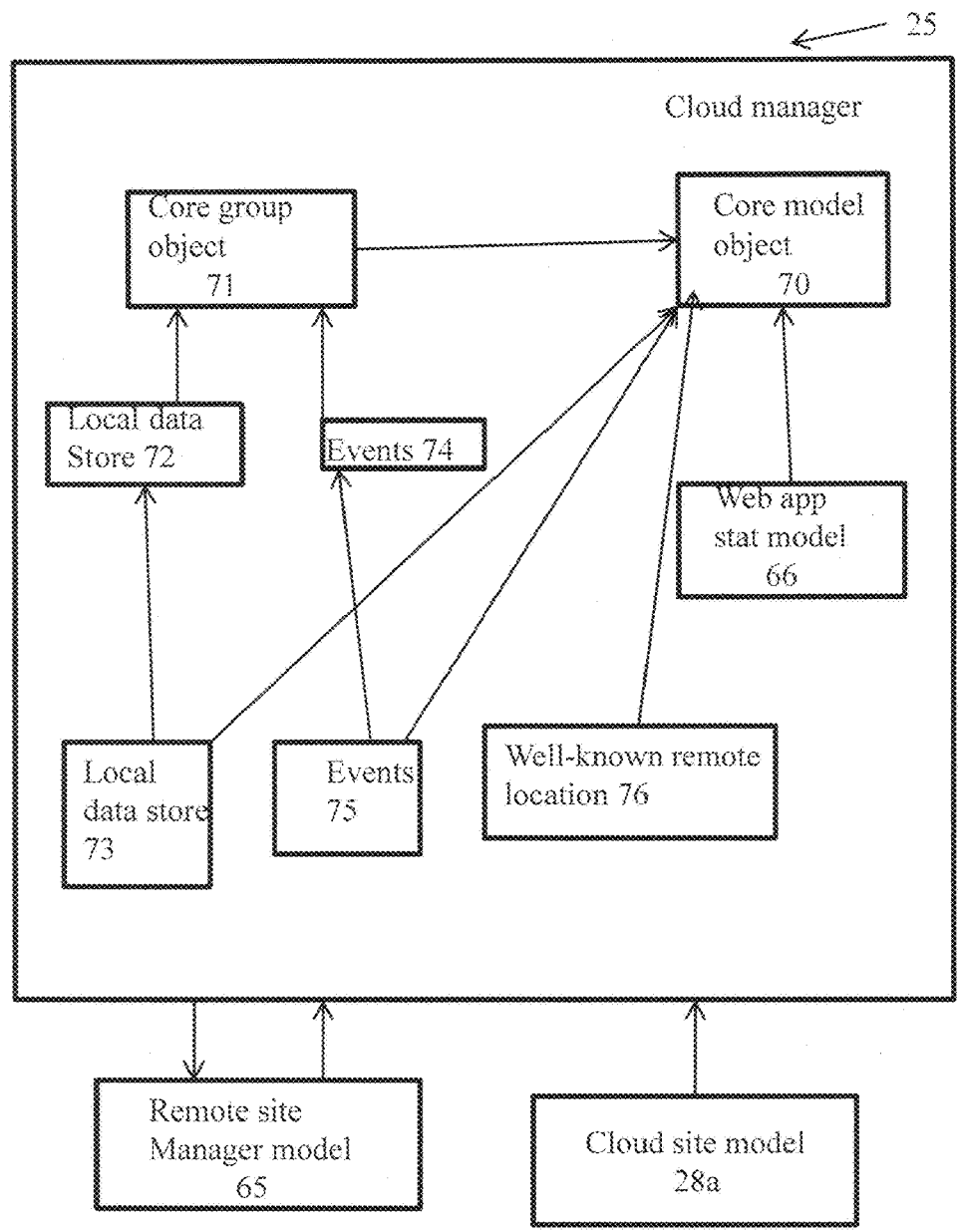
FIG. 2A is a block diagram of a preferred embodiment of a cloud manager of the present invention.

FIG. 2A provides an in-depth illustration of the cloud manager 25. The cloud manager 25, which is inside the IDE 23, synchronizes with the remote site manager model 65 for a given user and sends updates to the site manager model 65. The cloud manager 25 synchronizes directly against Web applications 32 via model information return in the site manager model 65. This is used for the Web application statistics model 66 which is shown graphically to the user. The cloud manager 25 synchronizes with cloud site model 28a. A core model object 70 is configured for model elements to synchronize against a remote model representation. Core model object 70 and core group object 71 does all of the following: fire events 74 and 75 when the remote model changes; delete themselves from the remote model; and serializes to a local data store 72 and 73 to enable an off-line mode. Each core model object 70 has a unique, well-known remote location 76, against which it is synchronized. The cloud manager 25 is configurable with request and response protocol handlers. Request protocol handlers authenticate a request, while response protocol handlers are responsible for decoding a response into a form, from which the object may be rebuilt.

The listener architecture allows subscription to a root element, which will subscribe the listener to all child objects of that model element.

Figure 2B:
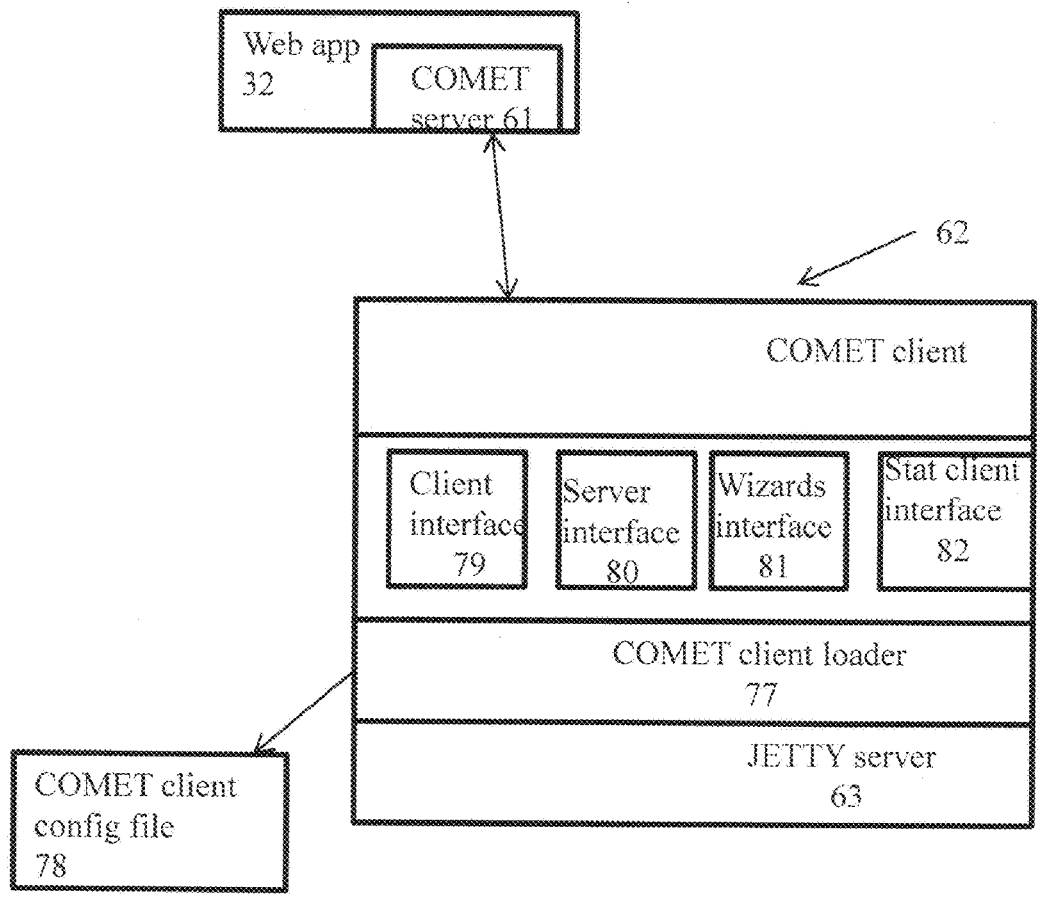
FIG. 2B is a block diagram of a preferred embodiment of isolated components of the software architecture of the present invention.

FIG. 2B illustrates interactions with a comet server 61. Comet clients 62 are pieces of IDE functionality that are called from the My Cloud Web application 32. Comet clients 62 fire events on well-known channels to update content. Comet clients 62 also respond to requests to get or set properties on remote model elements. In addition, they handle requests to synchronize the local and remote cloud application files. Comet clients 62 are configured via XML and dynamically loaded when the JETTY HTTP Server 63 is started. A Comet client loader 77 loads a Comet client configuration file 78. Comet clients 62 are contributed across multiple IDE plugins. The JETTY HTTP Server 63 serves both Comet requests and standard HTTP content requests. The Comet clients 62 integrate with requests for user interface elements outside the browser, including: opening wizards interface 81, views, perspectives, statistics client interface 82, deploy project client interface 79; and starting or stopping the local JAXER™ server interface 80. The Comet clients 62 also respond to requests to start, stop or restart services on the remote cloud application.

The core model object 70 interfaces with an ILocationObject. Each object has a unique location that is used to obtain and update the remote model for the object. The core model object 70 also interfaces with the ISynchronizableObject. Each object has a core set of methods to synchronize with the remote model. The core set of methods include the following: commit; update; perform action; and delete. The core model object 70 interfaces with the ITransformObject. Each object is able to serialize and de-serialize itself from either the remote format received from the Site Manager or the format obtained from the local data store when the Site Manager is unreachable. The core model object 70 further interfaces with the IModifiableObject. Each object is able to detect changes in the model and notify listeners when model changes occur. The core model object 70 implements the interfaces. The core group object 71 extends the core model objects 70 and allows encapsulation of grouped objects that are obtained from a single web service call. The group as a whole may be synchronized, or, alternatively, individual objects in the group may be synchronized.

Figure 3:
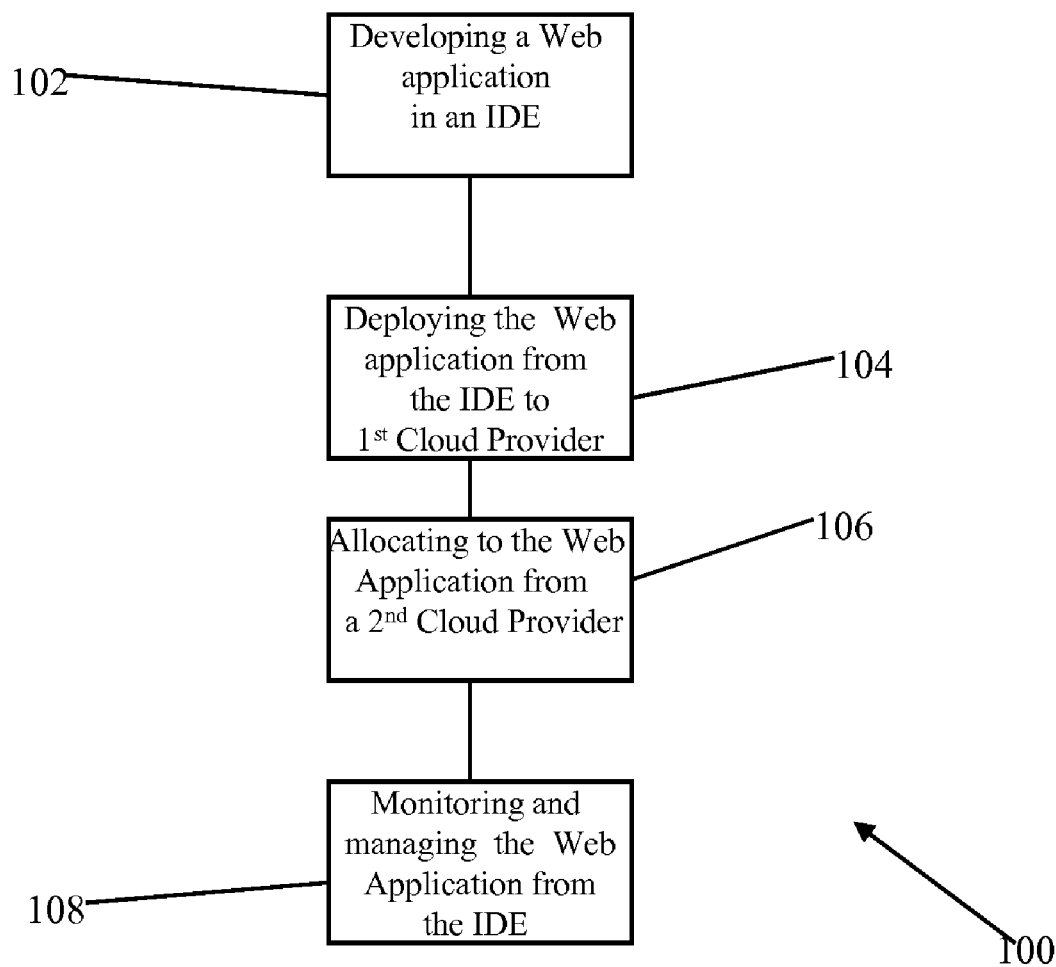
FIG. 3 is a flow chart of a general method of the present invention.

FIG. 3 is a flow chart of a general method 100 of the present invention. At block 102, a web application is developed within an IDE. At block 104, the Web application is deployed from the IDE to a primary cloud provider. At block 106, Web resources are allocated to the Web application from a secondary cloud provider. At block 108, the Web application is monitored and managed from the IDE or a cloud manager associated with the IDE.

Figure 4:
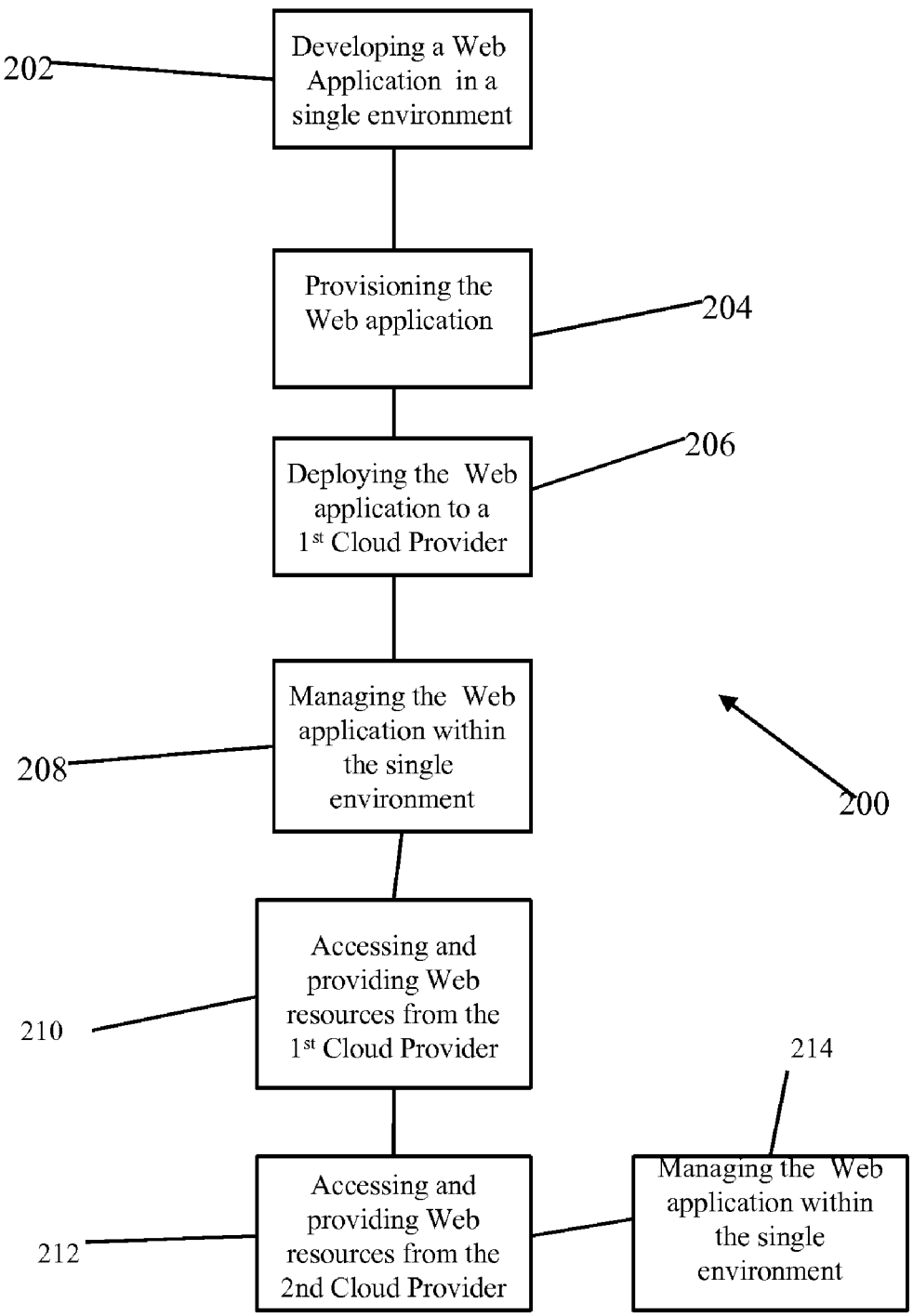
FIG. 4 is a flow chart of a specific method of the present invention.

FIG. 4 is a flow chart of a specific method 200 of the present invention. At block 202, a Web application 32 is developed within a single environment 23. The single environment is preferably an IDE. At block 204, the Web application 32 is provisioned. At block 206, the Web application is deployed from the single environment 23 to a primary cloud provider 28. At block 208, the Web application 32 is managed remotely using a cloud manager 25 associated with the single environment 23. At block 210, Web resources 50 from the primary cloud provider 28 are accessed for the web application using the cloud manager 25. At block 212, Web resources 50 from a secondary cloud provider 30 are accessed for the Web application 32 using the cloud manager 28. At block 214, the Web application 32 is managed from the within the single environment 23.

Figure 5:
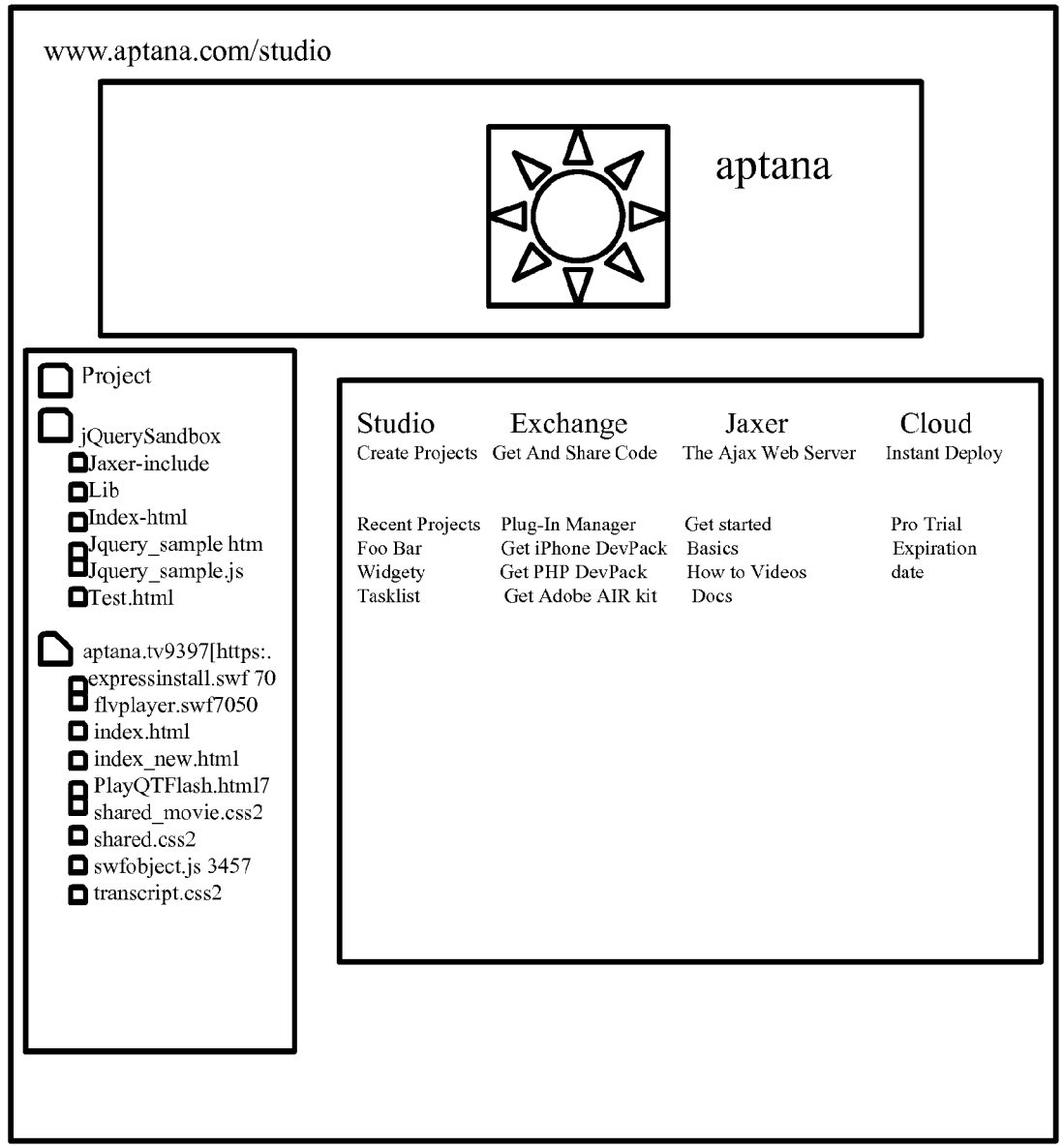
FIG. 5 is a screen page within an IDE on a user-interface illustrating a menu page with an IDE selected.

FIG. 5 illustrates the APTANA start page 300 with the Studio application (IDE) selected. Menus under the Studio application include create projects, recent projects, tasklist, and general Studio information.

The first step in deploying a project to Cloud is to set up a Web site name. By way of example, the user, who is deploying project "gullwing," is asked to enter a preferred Web site name for project "gullwing," such as "cars90210." APTANA Cloud then determines whether the preferred Web site name ("cars90210") is available. At step two, the user selects among various service plans available for the Cloud project. During the third step in deploying a project to Cloud, the user sets up enters his user information or sets up a new user account. Additional steps in deploying a project to Cloud include setting up billing information, accepting the Cloud services agreement, and confirming and placing the order. Upon placement of the order, the Web page is displayed, notifying the user that the site is being provisioned. Provisioning the site preferably includes the following steps: (1) contacting APTANA Cloud; (2) setting up the necessary servers; and (3) configuring the Web site.

Once a site has been provisioned on APTANA Cloud, a user may monitor the status of that Web site. FIG. 6 illustrates the particular My Cloud information for a selected site that is displayed to the user. For example, in the Web page 302 in FIG. 6, the details of the "cars90210" site are displayed under the "Overview" tab. Details include: the particular service plan selected for the site; a graph illustrating the number of hits for the site over a selected period of time; the local project name for the site; the local, main and staged site URLs; the server IP address; and the SVN location. In addition, an Events window may display any alerts regarding the site, such as a warning that the site is nearing its servers' capacity.

A user may add or invite additional users to the particular Cloud project. Users may be designated as either "admin" or "developer." Developers may sync projects, folders and files to the site. Admins have the ability to add or remove users for the site as well as sync projects, folders and files.

One of the benefits of APTANA Cloud is that it provides to the user valuable information regarding popularity of the project site such as "Hits Last 35 Days" for the project site "cars90210."

Figure 7:
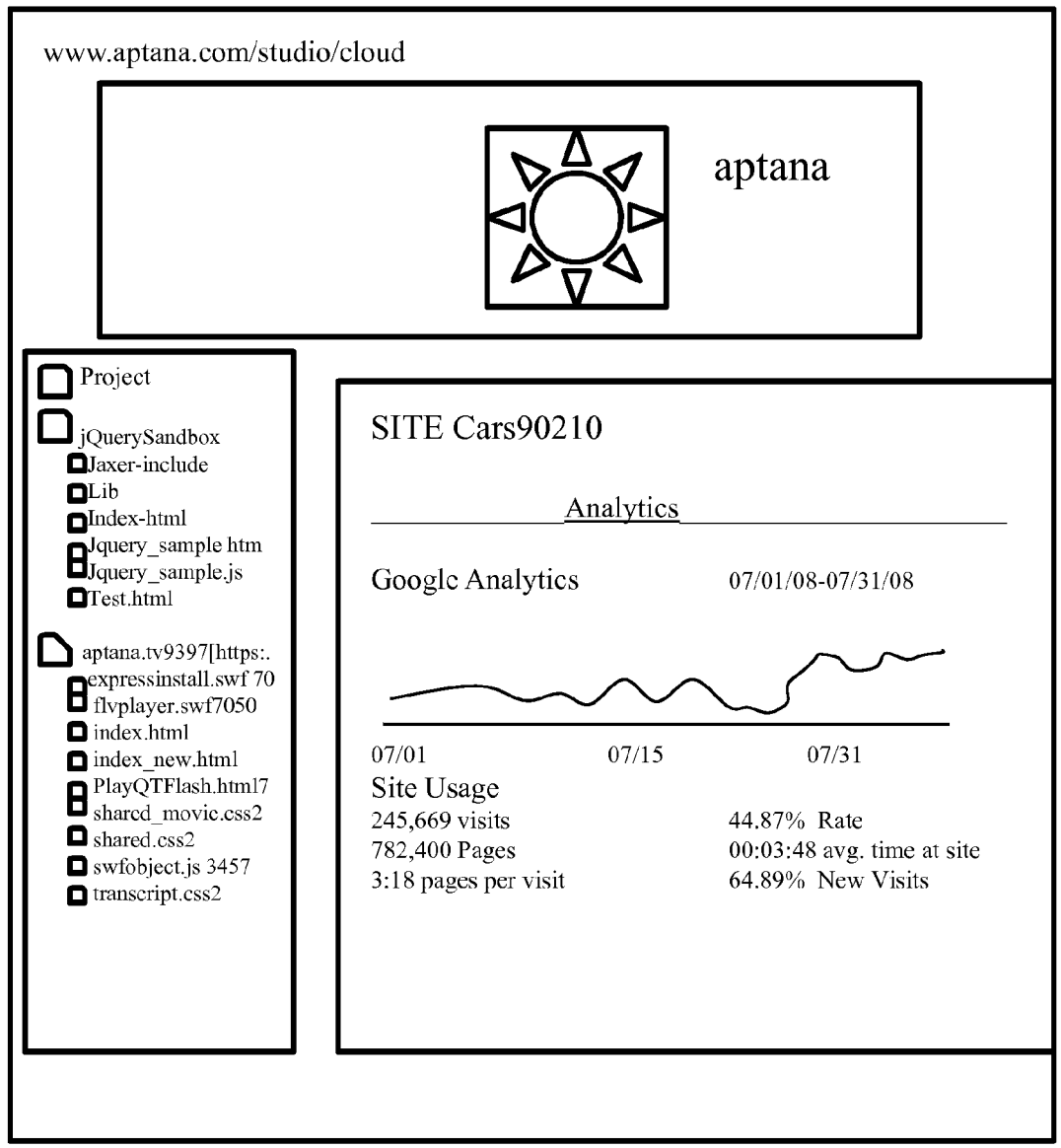
FIG. 7 is a screen page within an IDE on a user-interface illustrating a GOOGLE Analytics page for a Web Application.

With APTANA Cloud a user may incorporate GOOGLE Analytics to further monitor the project site. For example, the user may set up GOOGLE Analytics for the project site "cars 90210." Once the site has been set up with GOOGLE Analytics, future displays under the "Analytics" may be similar to that shown in the Web page 304 in FIG. 7, including graphical and numerical data regarding site usage.

Figure 8:
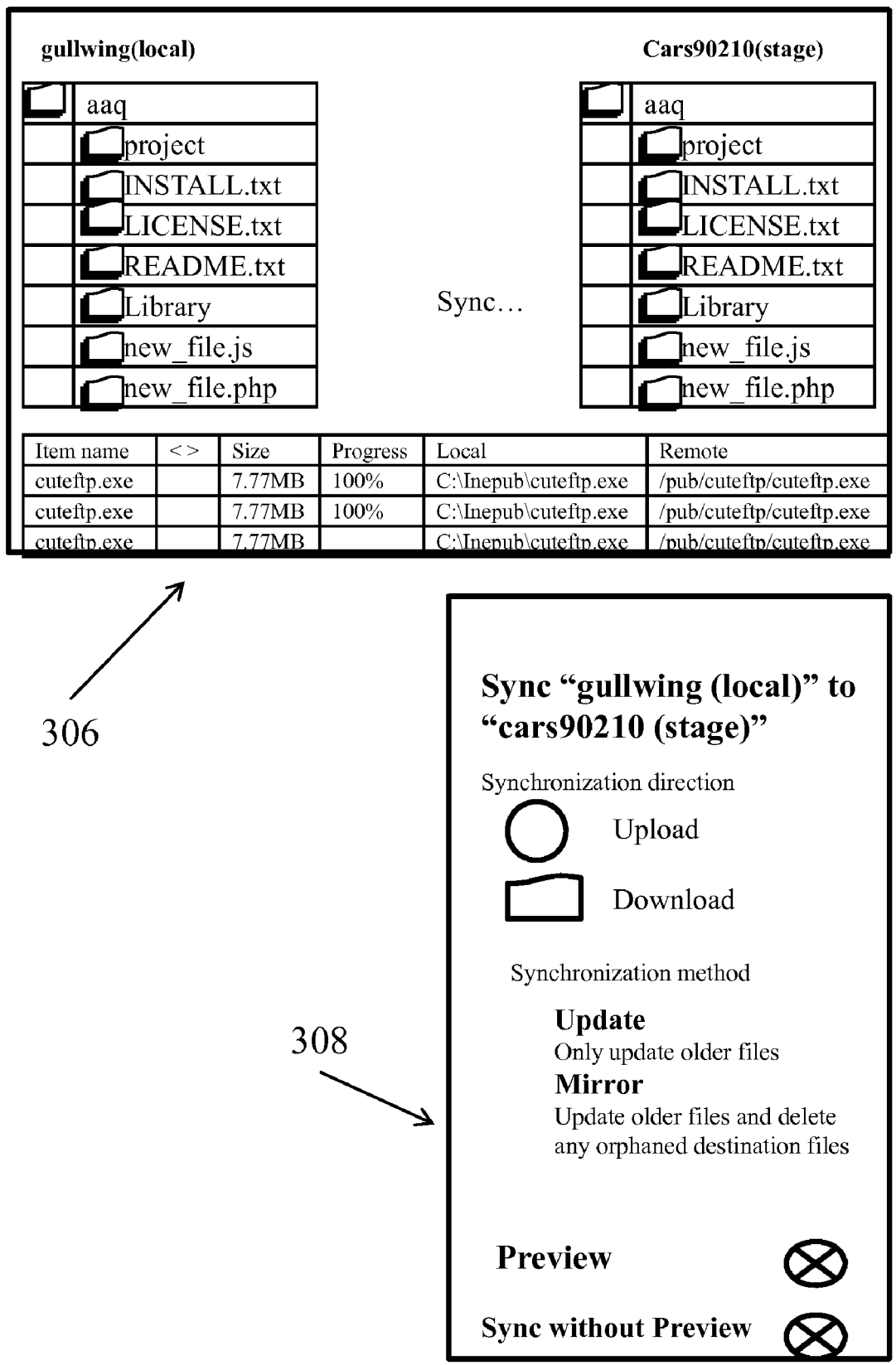
FIG. 8 illustrates a synching page for a Web Application from a site overview and a project view.

When the user modifies a project, the local site must then be synced with the stage site. FIG. 8 illustrates the synching of local site "gullwing" to project site "cars90210" with view of a Web site overview 306 and a project view 308. The Web page 310 shown in FIG. 9 provides further details regarding the syncing of the "gullwing" local site to the "cars90210" project site.

A detailed example of a preferred embodiment of the operation of the present invention is set forth below.

Global IDE requests are made in the following manner:

Projects

Client ID: 'projects'

To Channel ID: '/portal/projects'

Return Channel ID: '/portal/projects/'+publisherId

Return Data: JSON array of project names

Show a project in the projects view:
   To Channel ID: '/portal/projects/show'
   To Data: project:'project name'
   Return: Does not reply Open a perspective
   To Channel ID: '/portal/perspectives/show'
   To Data: id:'perspective id'
   Return: Does not reply Open a view
   To Channel ID: '/portal/views/show'
   To Data: id:'view id'
   Return: Does not reply Open a browser
   To Channel ID: '/portal/browser'
   To Data: url:'url to open in the browser'
   Return: Does not reply Clients
   Client ID: 'client listing'
   To Channel ID: '/portal/client/listings'
   Return Channel ID: '/portal/client/listings'+publishedId
   Return Data: JSON array of client IDs Open a new project wizard
   Client ID: 'new project'
   To Channel ID: '/portal/projects/new'
   To Data: String id of wizard to open, defaults to web project wizard if empty string
   Return Channel: Does not reply
   Return Data: Does not reply Get or set a preference
   To Channel ID: '/portal/preferences'
   To Data: request:'get'j'set' name:'name of pref' value:'value of pref if setting
   Return Data: action:'get' name:'name of pref' value:'value of pref if getting' (No return if setting)

Get the license status
   To Channel ID: '/portal/license'
   To Data: action:'licenseStatus'
type:'pro'j'trial'j'none'expires:'MM/DD/YYYY' (if license is pro or trial)

Open a wizard
   To Channel ID: '/portal/wizard'
   To Data: id:'wizard id' request:'new'l'import'l'export'
   No reply
   Aptana ID requests are generated as follows:

Get signed in user
   Client ID: 'aptana,--user'
   To Channel ID: '/portal/user'
   Return Channel ID: '/porta I/ user/'+pu bl isherId
   Return Data User name or empty string if no user signed in Sign In a User
   Client ID: 'aptana_user_login'
   To Channel ID: '/portal/user/login'
   To Data:
   request: 'loginUser'
   username: 'username'
   password: 'password'
   Return Channel: '/portal/user/'+publisherId
   Return Data:
   action: 'loginUser'
   userValid: true/false
   usernameValid: true false
   passwordValid: true false Log Out a User
   Client ID: TBD
   To Channel ID: '/portal/user/logout'
   To Channel Data:
   arequest: 'logoutUser'
   Return Channel: '/portal/user/'+publisherId
   Return Data:
   action: 'logoutUser'
   success: true/false Create New User
   Client ID: TBD
   To Channel ID: '/portal/user/create'
   To Channel Data:
   request: 'createUser'
   username: 'username'
   password: 'password'
   email: 'email'
   Return Channel: '/portal/user/'+publisherId Return Data:
   action: 'createUser'
   success: true/false
   usernameValid: true/false (false if username used)
   (any other reasons for failure can be added . . . )
   To Make Message center requests, the following are preferably used:

Display the message center
   To Channel ID: '/portal/messages/show'
   To Data: none
   Return: Does not reply Unread message count
   Client ID: 'unread messages'
   To Channel ID: '/portal/messages'
   Return Channel ID: Vporta I/messages/'+pu bl isherId
   Return Data Integer value of the number of unread messages Urgent unread message count
   To Channel ID: '/portal/messages/urgent'
   Return Channel ID: '/portal/messages/urgent/'+publisherId
   Return Data: Integer value of the number of urgent unread messages
   Plugins/Features requests are generated as follows:

Plugins List
   Client ID: TBD
   To Channel ID: '/portal/plugins/list'
   To Data:
   request: 'listPlugins'
   Return Channel ID: '/portal/plugins/list/'+publisherId
   Return Data:
   action: 'listPlugins'
   popular: [(array of hash maps . . . )
      id: 'pluginId'
      name: 'pluginName'
      description: 'plugin Description'
      link: 'pluginSiteLink'
      installed: true/false (whether or not the plugin is installed)
      update: true/false (whether or not an update is available)
   other: same spec as above, this is the list of third-party plugins Plugins to Install (Deprecated in favor of above . . . )
   Client ID: 'install plugins'
   To Channel ID: '/portal/plugins/list'
   Return Channel ID: '/portal/plugins/list'+publisherId
   Return Data: JSON structure of plugins that are installable Get changes features
   Client ID: 'feature changes'
   To Channel ID: '/portal/features/changes'
   Return Channel ID: '/portal/features/changes/'+publisherId
   Return Data: action:'featureChanges' changesExist: true I false
   changes: [{icl:'feature id', label:'label',newVersion:'new version', oldVersion:'old version', provider:'provider'} . . . ]

Install a plugin
   To Channel ID: '/portal/plugins/install'
   To Message String plugin id to install
   Return Channel ID: '/portal/plugins/install'+publisherId
   Return Data: true if the plugin install was successfully launched Check for plugin updates
   Client ID: 'check-for-updates'
   To Channel ID: '/portal/plugins/updates'
   Return Channel ID: '/portal/plugins/updates/'+publisherId
   Return Data: 'true' I 'false' if a update search was scheduled
   JAXER server requests are made as follows:

Show Jaxer Shell view
   Client ID: '/Portal/jaxer/JaxerClient'
   To Channel ID: '/portal/jaxer/laxerShellView'

Show Jaxer Activity Monitor view
   Client ID: '/Portal/jaxer/JaxerClient'
   To Channel ID: '/portal/jaxer/jaxerActivityMonitor'

Show Jaxer preference page
   Client ID: '/portal/jaxer/JaxerClient'
   To Channel ID: '/portal/jaxer/jaxerPreferences'

Show Servers view
   Client ID: '/portal/jaxer/JaxerClient'
   To Channel ID: '/portal/jaxer/jaxerServersView'

Show Jaxer Package Server dialog
   Client ID: '/Portal/jaxer/laxerClient'
   To Channel ID: '/portal/jaxer/jaxerPackageServer'

Get internal Jaxer server state
   Client ID: '/Portal/jaxer/JaxerController'
   To Channel ID: '/portal/jaxer/jaxerController'
   To Data: request:'serverStatus'
   Return Channel ID: '/portal/jaxer/jaxerController/'+publisherId
   Return Data action:'serverStatus' status: 'running'j'stopped'

Set internal Jaxer server state
   Client ID: '/Portal/jaxer/laxerClient'
   To Channel ID: '/portal/jaxer/jaxerController'
   To Data: req uest:'control Server' setState:'start'j'stop'
   Return Channel ID: '/portal/jaxer/jaxerController'
   Return Data: action:'controlServer' setState:'done'
   Cloud-specific requests are preferably generated as follows:

List the available products
   To Channel ID: '/portal/cloud/products'
   Return Channel ID: '/portal/cloud/products'+publisherId
   Return Data: action:'listProducts' products: [{name: 'product name', active:'active state', id:'product id'} . . . ]

Browse to a cloud sftp node
   To Channel ID: '/portal/cloud/site/browse'
   To Channel Data: id:'site id' request:'showFile'
   Return: does not reply Browse to a remote cloud file
   To Channel ID: '/portal/cloud/site/browse'
   To Channel Data: id:'site id' request:'showFile' path:'absolute path to file to display in the file view'
   Return: does not reply Open a remote cloud file
   To Channel ID: '/portal/cloud/site/browse'
   To Channel Data: id:'siteid' request:'open File' path:'absolute path to file to display in the editor'
   Return: does not reply Open the sync explorer to a project and cloud sftp site
   To Channel ID: '/portal/cloud/site/browse'
   To Channel Data: id:'site id' request:'showExplorer'
   Return: does not reply Get the name, type, and deployed status of all workspace projects
   To Channel ID: '/portal/projects/list'
   Return Channel ID: '/portal/projects/undeployed'+publisherId
   Return Data: projectsExist: true I false projects:[{name: 'project name',
   type: 'a i r'J'web'J'rai Is'J'ph p'l'un known', deployed: true I fa lse,
   siteId:'id of site if deployed'}]

Log to cloud console and ide log
   To Channel ID: '/portal/cloud/log'
   To Data: string that should be logged
   Response: none Get site statistics
   To Channel ID: '/portal/cloud/statistics'
   To Data: request:'getStats' type:'web'J'resources' id:'site id'
   Response Channel ID: '/portal/cloud/statistics/'+publisherId
   Response Data:
   action: 'getStats'
   id: 'site id'
   type: 'web'J'resources'
   groups: [{
     startHour:'two digit hour'
     startMinute:'two digit minute'
     date:'month/day date string'
     groupName: 'groupName' (i.e. Memory, Swap, Hits, etc.),
     dataItems: [{
       data: [array of data . . . [1,1][2,2], . . . ]
       label: seriesLabel (what will show in the legend)
       {more data as determined by group name (usually avg., max, min, etc.)}]
   other groups as determined by type 1]

Change project association for a site is preferably generated as follows:
  To Channel ID: '/portal/cloud/site/project'
  To Data: req uest:'ch a nge Project' project:'project name' site:'site id'
  Return Channel ID: '/portal/cloud/site/project/'+publisherId
  Return Data: actio n:'cha n ge Project' project:'project name'
  site:'site id'

Perform a backup (data dump) on a site is preferably generated as follows:
  To Channel ID: '/portal/cloud/site/dump'
  To Data: request:'dumpData' id:'site id'
  Return Channel ID: '/portal/cloud/site/dump/'+publisherId
  Return Data: action:'dumpData' success: true I false id: 'site id'

Sync a site is preferably generated as follows:
  To Channel ID: '/portal/cloud/sync'
  To Data: request:'syncSite' siteId:'id of site to sync'
  Return Data None, start syncs dialog.

Site manager availability is preferably generated as follows:
  Client ID:'/portal/cloud/available'
  To Channel ID:'/portal/cloud/available'
  Return Channel ID:'/portal/cloud/available/'+publisherId
  Return Data: action:'cloudStatus' availableftrue I false Domain name availability is preferably generated as follows:
  Client ID: '/portal/cloud/deploy/checkSiteName'
  To Channel ID: 'portal/cloud/deploy'
  Message Data: request:'checkSiteName' siteName:'site name to check'
  Return Channel ID: '/portal/cloud/deploy'+publisherId
  Return Data: request:'checkSiteName' siteUsed: true I false User name availability is preferably generated as follows:
  Client ID: '/Portal/cloud/deploy/checkUserName'
  To Channel ID: '/portal/cloud/deploy'
  Message Data: request:'checkUserName' userName:'user name to check'
  Return Channel ID: '/portal/cloud/deploy'+publisherId
  Return Data: action:'checkUserName' na meUsed: true I false Validate user is preferably generated as follows:
  Client ID: '/portal/cloud/deploy/validateUser'
  To Channel ID: '/porta I/cl o u d/de ploy'
  Message Data: request:'validateUser'
  username:'user name' password:'password'
  Return Channel ID: '/portal/cloud/deploy'+publisherId
  Return Data: action:'validateUser' userVal id:true I false
  userId:"userId"
  userna me0k: true I false password0k: true I false
  describeUser
  createUser
  updateUser
  deleteUser Deploy a project
  Client ID: '/portal/cloud/deploy/createSite'
  To Channel ID: '/portal/cloud/deploy'
  To Data:
  req uest:'de ploy Project'
  userId:'user name'
  password:'password'
  siteName:'domain to create'
  project:'name of workspace project'
  servicePlanId:'type of site to create, 'jaxer' for now'
  billingInfo:
    firstName:'first name'
    lastName:'last name'
    address1:'address 1'
    address2:'address 2'
    city:'city'
    state:'two-digit state'
    country:'country code'
    zip:'zip code'
    phone:'phone number'
    billingName:'name on the credit card'
    creditCardNumber:'credit card number'
    expiration:'credit card expiration'
    cvv2:'code from card'
  Return Channel ID: '/portal/cloud/deploy/'+publisherId
  Return Data: action:'deployProject' siteCreated:true I falseid: <id
  of site created>
  error: <error message if one exists, only uses this value if siteCreated:false>

List sites
  Client ID: 'list sites'
  To Channel ID: '/portal/cloud/sites'
  Return Channel ID: '/portal/cloud/sites/'+publisherId
  Return Data: action: 'listSites' sites: [{id: 'siteld', status: 'running/error/
  pending', name: 'site name' empty array if no sites or user not logged in Describe a site
  To Channel ID: '/portal/cloud/sites'
  Return Channel ID: '/portal/cloud/sites/'+publisherId
  To Data:
  request: 'siteInfo'
  id: 'siteld'
  refresh: true I false (optional, if true return action will be siteInfo Refresh)
  Return Data:
    action: 'siteInfo'
    type: 'servicePlanType' (jaxer for now)
    project: 'projectName'
    domain: 'siteDomain'
    ip: 'siteIp'
    svn:'svn url'
    backups:'backups url'
    db:'url to php my admin'
    analytics:'google analytics url'
    resources:'resource stats url'
    webstats:'web stats url'
    jaxerLog:'path to jaxer log'
    jaxerLogJS:'path to jaxerLogjs'
    jaxerAppsJS:'path to jaxerAppsjs'
    jaxerConfigJS:'path to configjs'
    privateLog:'path to access log for private area'
    privateErrorLog:'path to error log for private area'
    publicLog:'path to access log for public area'
    publicErrorLog:'path to error log for public area'
    disk:'latest stats of the percentage of disk being used'
    diskMax:'double number of gigs on box'
    status:'Running/Pending/Error'
    monitoring:true I false
    lastSync:'last sync event content' lastSyncTime:'last sync event timestamp'
lastDump:'last dump event content'
lastDumpTime:'last dump event timestamp'
id:'siteld'
events: [ ] (eventually an array of hash objects for messages List the events for a site
    To Channel ID: '/portal/cloud/site/events'
    To Data: request:'listEvents'
    Return Channel: '/portal/cloud/site/events'
    Return Data: action:'listEvents' id:'site id'
    events[{time:'timestamp',severity:'severity id',
    value:'event content'}]

List the services on a site
    Client ID: '/portal/cloud/services'
    To Channel ID: '/portal/cloud/services'
    To Data: request:'listServices' id:'site id'
    Return Channel ID: '/portal/cloud/services/'+publisherId
    Return Data: action:'listServices' services: [{name:'service name', status:'service status',
version:'0.9.7.2824',commands:['command name', . . . ]} . . . . ]

Stop/Start a service on a site
    To Channel ID: '/portal/cloud/services'
    To Data: request:'changeService' id:'site id'
    serviceAction:'start'j'stop'l'restart'

Upgrade a service on a site
    Client ID: '/portal/cloud/services'
    To Channel ID: '/portal/cloud/services'
    To Data: request:'changeService' id:'site id'
    serviceAction:'upgrade' version:'new version to upgrade to'

Service events
    Return Channel ID: '/portal/cloud/site/events/'+siteId+'/services'
    Return Data: {action:'serviceEvent', id:'site id', name:'service name', version:'service version', status:'service status'}

List available site versions
    To Channel ID: '/portal/cloud/services/versions'
    Return Channel ID: '/portal/cloud/services/versions/'+publisherId
    Return Data: action:'listVersions' services: [{name:'service name', versions: ['version V, . . . ]}]
    configureSite; rebootSite; deleteSite; getStats; listRoles; addAccount;
    deleteAccount; create Delegation; delete Delegation; listDelegations;

Get the Channel types.
    To Channel ID: '/portal/cloud/channelTypes'
    Response Channel ID: '/portal/cloud/channelTypes/'+publisherId
    Response Data: action:'listChanneiTypes' types:
    [{icl:'channel type id', name:'channel type name'}, . . . ]

Get the Event types
    To Channel ID: '/portal/cloud/eventTypes'
    Response Channel ID: '/portal/cloud/eventTypes/'+publisherId
    Response Data: action:'listEventTypes' types[{id:'event type
    id', name:'event type name'}, . . . ]

Get the subscriptions a user has:
    To Channel ID: '/portal/cloud/subscriptions'
    To Data: request:'ljstSubscriptions'
    Return Channel ID: '/portal/cloud/subscriptions/'+publisherId
    ResponseData:action:'ListSubscriptions'subscriptions:
    [{id:'subscriptionid',event:{id:'eventtypeid',name:'eventtyp
ename'},channel:{id:'channelid',name:'channeltypename',value:'
    channel value'}]

Add a subscription
    To Channel ID: '/portal/cloud/subscriptions'
    To Data: request:'addSubscription', value:'subscription value',
    channel:'channel type id', event:'event type id'
    Return Channel ID: '/portal/cloud/subscriptions/'+publisherId
    Response Data: action:'addSubscription' success: true J false Delete a subscription
    To Channel ID: '/portal/cloud/subscriptions'
    To Data: request:'deleteSubscription', id:'subscription id'
    Return Channel ID: '/portal/cloud/subscriptions/'+publisherId
    Response Data: action:'deleteSubscription' success: true I fa lse List the billing accounts
    To Channel ID: '/portal/cloud/billing'
    To Data: request:'listBilling'
    Response Data: action:'listBilling' accounts: [{id:'billing account id', name:'billing name', number:'billing number',
    expiration:'billing expiration Delete a billing account
    To Channel ID: '/portal/cloud/billing'
    To Data: request:'deleteBilling' id:'billing account id'
    Response Data: action:'deleteBilling' success:true I false Add a billing account
    To Channel ID: '/portal/cloud/billing'
    To Data: request:'addBilling' name:'billing name'
    number:'billing number' expiration:'billing expiration'
    Response Data: action: 'addBilling' success: true I fa lse List the site memberships
    To Channel ID: '/portal/cloud/memberships'
    To Data: request:'listBilling'
    Response Data: action:'listMemberships' memberships:
    [{role:'role id', user:'user id'}]

Delete a billing account
    To Channel ID: '/portal/cloud/memberships'
    To Data: request:'deleteMembership' id:'membership id' site:'site id'
    Response Data: action:'deleteMembership' success: true I false Add a membership
    To Channel ID: '/portal/cloud/memberships'
    To Data: request:'addMembership' role:'role id' user:'user name' id:'site id'
    Response Data: action:'addMembership' success: true false deleteSite
  Client ID: TBD
  To Channel ID: '/portal/cloud/sites'

To Data:
  request: 'deleteSite'
  id: 'siteId

Return Data
  action: 'deleteSite' success: true false
  backupSite
  suspend Site
  restoreSite
  unsuspendSite
  listBackups
  describeBackup
  remove Backup From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim:

1. A system for developing, deploying, managing and monitoring a Web application in a single environment, the system comprising:
  an integrated development environment for developing a Web application utilizing a plurality of client-technology languages and a plurality of server-side languages;
  a network;
  a primary cloud provider having a primary plurality of Web resources for supporting the Web application, the primary cloud provider located on the network at a first URL;
  at least one secondary cloud provider having a secondary plurality of Web resources for supporting the Web application, the secondary cloud provider located on the network at a second URL, the second URL different than the first URL; and
  a cloud manager having an application programming interface, the cloud manager remotely and automatically managing the Web application from within the integrated development environment, wherein the cloud manager deploys the Web application to a primary cloud provider, provisions the Web application with the primary plurality of Web resources from the primary cloud provider, automatically provides scalability for the Web application, monitors the load on the Web application and determines if a current level of Web resources is appropriate for the Web application to perform within a predetermined performance range, the cloud manager accessing and providing the primary plurality of Web resources from the primary cloud provider for the Web application and the cloud manager automatically accessing and providing the secondary plurality of Web resources from the secondary cloud provider for the Web application during a period of high load activity on the Web application, wherein the cloud manager loads a local data store model and synchronizes the local data store model with a remote site manager model, and sends updates to the remote site manager model, wherein the cloud manager further synchronizes directly against the Web application through a model information return in the remote site manager model for use by a Web application statistics model for communication to an operator; and
  a user interface for the operator to access the integrated development environment and the cloud manager over the network.

2. A method for developing, deploying, managing and monitoring a Web site in a single integrated development environment, the method comprising:
  developing a Web site in a single integrated development environment utilizing a plurality of client-technology languages and a plurality of server-side languages, the single integrated development environment comprising a cloud manager;
  deploying the Web site utilizing the cloud manager to a primary cloud provider having a primary plurality of Web resources for use by the Web site, the primary cloud provider located on a network at a first URL;
  provisioning the Web site with the primary plurality of Web resources from the primary cloud provider by automatically accessing and providing the primary plurality of Web resources from the primary cloud provider for the Web site utilizing the cloud manager;
  automatically accessing and providing a secondary plurality of Web resources from at least one secondary cloud provider for the Web site utilizing the cloud manager, the secondary cloud provider located on the network at a second URL, the second URL different than the first URL; and
  monitoring and managing the performance of the Web site from the single integrated development environment utilizing the cloud manager to automatically provide scalability for the Web site and monitor the load to determine if a current level of Web resources is appropriate for the Web site to perform within a predetermined performance range, wherein during a period of high demand the cloud manger automatically accesses a plurality of additional Web resources from the primary cloud provider and the secondary cloud provider for use by the Web site, wherein the cloud manager loads a local data store model and synchronizes the local data store model with a remote site manager model, and sends updates to the remote site manager model, wherein the cloud manager further synchronizes directly against the Web site through a model information return in the remote site manager model for use by a Web site statistics model for communication to an operator through a user interface for access to the single integrated development environment and the cloud manager over the network.

* * * * *